US012269650B2

(12) United States Patent
Robertson

(10) Patent No.: US 12,269,650 B2
(45) Date of Patent: Apr. 8, 2025

(54) CONTAINER AND BOTTOM END CONSTRUCTION THEREFOR

(71) Applicant: Huhtamaki, Inc., De Soto, KS (US)

(72) Inventor: Ronald Robertson, Kansas City, MO (US)

(73) Assignee: HUHTAMAKI, INC., De Soto, KS (US)

(*) Notice: Subject to any disclaimer, the term of this patent is extended or adjusted under 35 U.S.C. 154(b) by 0 days.

(21) Appl. No.: 18/447,219

(22) Filed: Aug. 9, 2023

(65) Prior Publication Data

US 2023/0382589 A1 Nov. 30, 2023

Related U.S. Application Data

(62) Division of application No. 16/838,898, filed on Apr. 2, 2020, now Pat. No. 11,760,529.

(Continued)

(51) Int. Cl.
*B65D 3/22* (2006.01)
*B65D 3/04* (2006.01)
(Continued)

(52) U.S. Cl.
CPC ................. *B65D 3/22* (2013.01); *B65D 3/04* (2013.01); *B65D 81/3869* (2013.01);
(Continued)

(58) Field of Classification Search
CPC ........ B65D 3/14; B65D 21/0233; B65D 3/06; B65D 81/3865; B65D 1/265; B65D 11/16;
(Continued)

(56) References Cited

U.S. PATENT DOCUMENTS 1,756,243 A 4/1930 Benson
1,814,671 A 7/1931 Dufour
(Continued)

FOREIGN PATENT DOCUMENTS

AU 2007100802 A4 9/2007
CN 102846143 A * 1/2013 ......... B65D 21/0233
(Continued)

OTHER PUBLICATIONS

Examination Report for Mexican Patent Application MX/a/2020/004908, Mexican Institute of Industrial Property, Oct. 9, 2023, 10 pages.

*Primary Examiner* — Christopher R Demeree
(74) *Attorney, Agent, or Firm* — Husch Blackwell LLP

(57) ABSTRACT

A container with a deep recessed bottom end construction is provided. The container includes an inner receptacle having a sidewall and a bottom wall defining an interior volume within the receptacle. The container further includes an outer sleeve wrapped around the inner receptacle with a lower end extending below the lower edge of the receptacle to form a deep bottom recess within a lower portion of the container. The lower end of the receptacle sidewall has a taper angle that is different from a taper angle of an upper portion of the sidewall. The lower end of the receptacle sidewall may engage or contact the inner surface of the outer sleeve. The outer sleeve may include reverse bend and/or a second bottom wall onto which a lower end of the receptacle may sit.

14 Claims, 10 Drawing Sheets

Related U.S. Application Data

(60) Provisional application No. 62/830,209, filed on Apr. 5, 2019.

(51) Int. Cl.
*B65D 81/38* (2006.01)
*B31B 110/10* (2017.01)
*B31B 110/20* (2017.01)
*B31B 120/00* (2017.01)
*B31B 120/50* (2017.01)

(52) U.S. Cl.
CPC ....... *B31B 2110/10* (2017.08); *B31B 2110/20* (2017.08); *B31B 2120/004* (2017.08); *B31B 2120/50* (2017.08)

(58) Field of Classification Search
CPC ............. B31B 2110/10; B31B 2110/20; B31B 2120/002
USPC ........ 229/4.5, 103.11, 122.32, 400; 206/515, 206/520, 503, 519; 220/592.2, 62.12, 739
See application file for complete search history.

(56) References Cited

U.S. PATENT DOCUMENTS

| | | | |
|---|---|---|---|
| 2,266,828 | A | 12/1941 | Sykes |
| 2,661,889 | A | 12/1953 | Phinney |
| 2,675,954 | A | 4/1954 | Vogel |
| 4,007,670 | A | 2/1977 | Albano et al. |
| 4,548,348 | A | 10/1985 | Clements |
| 5,145,107 | A | 9/1992 | Silver et al. |
| 5,363,982 | A | 11/1994 | Sadlier |
| 5,460,323 | A | 10/1995 | Titus |
| 5,524,817 | A | 6/1996 | Meier et al. |
| 5,542,599 | A | 8/1996 | Sobol |
| 5,660,326 | A | 8/1997 | Varano et al. |
| 5,685,480 | A | 11/1997 | Choi |
| 5,752,653 | A | 5/1998 | Razzaghi |
| 6,068,182 | A | 5/2000 | Tokunaga |
| 6,085,970 | A | 7/2000 | Sadlier |
| 6,109,518 | A | 8/2000 | Mueller et al. |
| 6,152,363 | A | 11/2000 | Rule, Jr. |
| 6,193,098 | B1 | 2/2001 | Mochizuki et al. |
| 6,260,756 | B1 | 7/2001 | Mochizuki et al. |
| 6,378,766 | B2 | 4/2002 | Sadlier |
| 6,663,926 | B1 | 12/2003 | Okushita et al. |
| 6,926,197 | B2 | 8/2005 | Hed et al. |
| 7,380,685 | B2 | 6/2008 | Simmons et al. |
| 7,451,910 | B2 | 11/2008 | Frost et al. |
| 7,458,504 | B2 | 12/2008 | Robertson et al. |
| 7,481,356 | B2 | 1/2009 | Stahlecker |
| 7,677,435 | B2 | 3/2010 | Stahlecker |
| 7,699,216 | B2 | 4/2010 | Smith et al. |
| 7,717,325 | B2 | 5/2010 | Puls et al. |
| 7,922,071 | B2 | 4/2011 | Robertson et al. |
| RE42,421 | E | 6/2011 | Toida et al. |
| 7,984,846 | B2 | 7/2011 | Messerschmid et al. |
| 7,993,254 | B2 | 8/2011 | Robertson et al. |
| 8,172,127 | B2 | 5/2012 | Frost et al. |
| 8,360,263 | B2 | 1/2013 | D'Amato |
| 8,387,857 | B2 | 3/2013 | Messerschmid |
| 8,561,830 | B2 | 10/2013 | Hallberg |
| 8,727,206 | B2 | 5/2014 | Messerschmid et al. |
| 8,740,055 | B2 | 6/2014 | Stahlecker |
| 8,851,363 | B2 | 10/2014 | Stahlecker |
| 8,875,986 | B2 | 11/2014 | Stahlecker |
| 8,932,428 | B2 | 1/2015 | D'Amato |
| 9,238,524 | B2 | 1/2016 | Messerschmid et al. |
| 9,260,220 | B2 | 2/2016 | Messerschmid et al. |
| 9,266,660 | B2 | 2/2016 | Cai et al. |
| 9,290,312 | B2 | 3/2016 | Brown |
| 9,340,345 | B2 | 5/2016 | Leser et al. |
| 9,718,601 | B2 | 8/2017 | Stahlecker et al. |
| 9,826,850 | B2 | 11/2017 | Hasani |
| 10,023,348 | B2 | 7/2018 | D'Amato |
| 10,493,735 | B2 | 12/2019 | Ding |
| 2004/0188450 | A1 | 9/2004 | Marshall et al. |
| 2008/0023537 | A1 | 1/2008 | Frost et al. |
| 2008/0029588 | A1 | 2/2008 | Messerschmid et al. |
| 2008/0048016 | A1 | 2/2008 | Simmons et al. |
| 2008/0314910 | A1 | 12/2008 | Beal et al. |
| 2009/0110782 | A1 | 4/2009 | Mellor |
| 2009/0159653 | A1 | 6/2009 | Stahlecker |
| 2009/0184020 | A1 | 7/2009 | Messerschmid et al. |
| 2010/0108693 | A1 | 5/2010 | Zhang et al. |
| 2010/0108695 | A1 | 5/2010 | Zhang et al. |
| 2010/0187296 | A1 | 7/2010 | Puls et al. |
| 2011/0174872 | A1 | 7/2011 | Hsieh |
| 2011/0240506 | A1 | 10/2011 | D'Amato |
| 2012/0097685 | A1 | 4/2012 | Babinsky et al. |
| 2012/0097688 | A1 | 4/2012 | Babinsky et al. |
| 2012/0190519 | A1 | 7/2012 | Frost et al. |
| 2012/0199641 | A1 | 8/2012 | Hsieh |
| 2012/0261427 | A1 | 10/2012 | Bates |
| 2012/0279650 | A1 | 11/2012 | Babinsky et al. |
| 2013/0140320 | A1 | 6/2013 | Nadella et al. |
| 2014/0263602 | A1* | 9/2014 | Leser ................. B65D 81/3869 493/84 |
| 2015/0048086 | A1 | 2/2015 | Brown |
| 2015/0108146 | A1 | 4/2015 | Jameson et al. |
| 2016/0046436 | A1 | 2/2016 | Haddad |
| 2017/0113831 | A1 | 4/2017 | Aubele et al. |
| 2017/0182726 | A1* | 6/2017 | Lips ......................... B65D 3/22 |
| 2017/0253417 | A1 | 9/2017 | Stahlecker et al. |
| 2018/0016052 | A1 | 1/2018 | Tomioka et al. |
| 2019/0315555 | A1 | 10/2019 | Vogt et al. |
| 2019/0315556 | A1 | 10/2019 | Vogt et al. |
| 2019/0315557 | A1 | 10/2019 | Mohan et al. |
| 2022/0204247 | A1* | 6/2022 | Bragg ................ B65D 21/0233 |
| 2022/0234812 | A1* | 7/2022 | Mohan ..................... B65D 3/14 |

FOREIGN PATENT DOCUMENTS

| | | | |
|---|---|---|---|
| EP | 0371918 | B1 | 6/1994 |
| EP | 2623429 | A1 | 8/2013 |
| JP | S524380 | A | 1/1977 |
| WO | 2009130043 | A1 | 10/2009 |
| WO | 2019200186 | A1 | 10/2019 |
| WO | 2019200188 | A1 | 10/2019 |
| WO | 2019200189 | A1 | 10/2019 |

* cited by examiner

CONTAINER AND BOTTOM END CONSTRUCTION THEREFOR

CROSS-REFERENCE TO RELATED APPLICATIONS

This application is a Divisional of and claims priority to U.S. patent application Ser. No. 16/838,898, filed on Apr. 2, 2020, to Ronald Robertson, entitled "Container and Bottom End Construction Therefor," currently pending, which claims priority to U.S. Provisional Patent Application Ser. No. 62/830,209, filed on Apr. 5, 2019, to Ronald Robertson entitled "Container and Bottom End Construction Therefor." The entire disclosures of the above references are incorporated herein by reference.

BACKGROUND OF THE INVENTION

Cups and containers suitable for holding drink and/or food items are well known in the food and beverage packaging industry. Food and beverage providers often desire to have a variety of containers of different sizes in order to provide different quantity options and sizes to consumers. However, with containers of differing sizes, each size of container typically has a different top end diameter, thus requiring lids specifically dimensioned and matched for each size of container. One potential solution to this problem is to increase the height of larger containers so that the larger containers can hold a greater volume while maintaining the same top end diameter and lid size. One problem with this solution is that containers having an increased height, while maintaining the same top end diameter, tend to have reduced stability. This decrease in stability is a result of the combination of the containers' increased height and smaller diameter bottom ends. Stability can be improved by decreasing the taper of the sidewall angle such that the diameter of the bottom end of the container does not become undesirably small. However, a reduced sidewall taper can increase the likelihood that multiple stacked containers may inadvertently become wedged together. In other words, this reduced sidewall taper can make nested containers more susceptible to becoming frictionally stuck or vacuum locked together and, therefore, make it difficult for a user to remove only a single container from a stack of containers.

Insulated cups and containers suitable for holding hot or cold drink and/or food are also well known. Such containers may include an inner receptacle surrounded by an outer sleeve forming an insulative layer. Various methods of wrapping or applying the outer sleeve to the inner receptacle are known. However, such methods are not without deficiencies. Once such issue relates to the misalignment or indexing of the outer sleeve and inner receptacle. When the outer sleeve and inner receptacle are misaligned or misindexed relative to one another, such irregulates can increase the likelihood that multiple stacked containers may inadvertently become stuck together. Another such issue relates to the formation of a uniform circumferential insulating gap between the inner receptacle and outer sleeve.

Accordingly, a need exists for a container design having an increased height and volume while reducing the tendency of becoming interlocked when stacked or nested with other containers. A further need exists for an insulated container and method of making same wherein the inner receptacle and outer sleeve can be properly aligned and indexed relative to one another.

SUMMARY OF THE INVENTION

One embodiment of the present invention is generally directed to a multiwalled container comprising a receptacle and an outer sleeve. The receptacle may be constructed of paperboard or other suitable material and can include a circumferential sidewall with an outwardly rolled upper lip. The outer sleeve, which may also be constructed of paperboard or other suitable material, can be wrapped and secured around the receptacle, forming a generally frustoconical insulted container.

The outer sleeve may be positioned relative to the receptacle so that the outer sleeve's top edge is positioned just below the rolled upper lip of the inner receptacle and the bottom edge of the outer sleeve extends below the bottom end of the receptacle. The outer sleeve may function as an insulating layer, alleviating the need for an external or ancillary insulating layer to be added after assembly. The downwardly extending lower end of the outer sleeve may further aid when multiple containers are stacked and nested together by preventing the containers from fully nesting together and thereby inadvertently becoming stuck one within another.

The inner receptacle may further include a lower edge that flares outwardly relative to the angle of the inner receptacle sidewall. This flaring of the lower edge is beneficial in aligning or indexing the inner receptacle relative to the outer sleeve. This flaring of the lower edge of the inner receptacle sidewall may additionally assist in providing an increased diameter to the terminal edge of the outer sleeve.

More specifically, one embodiment of the present invention is directed to a multi-walled container having an inner receptacle and an outer sleeve with a circumferential gap optionally defined therebetween. The inner receptacle can include a generally frustoconical peripheral sidewall and a bottom wall attached thereto. The bottom wall may include a downwardly depending annular skirt secured the receptacle sidewall. The lower end of the receptacle sidewall can include a reverse bend portion at least partially surrounding the annular skirt of the bottom wall. The sidewall may include an upper portion having first taper angle and a lower end having a second taper angle. The outer sleeve has an inner surface and an outer surface, and at least partially surrounds the inner receptacle. When assembled, at least a portion of a lower edge of the lower end of the receptacle sidewall is in contact with the inner surface of the outer sleeve.

A lower end of the outer sleeve may extend beyond and be located below the lower edge of the receptacle sidewall in order to form a deep well container. The lower end of the outer sleeve can include a reverse bend portion having an upper terminal edge. At least a portion of the lower edge or lower end of the receptacle sidewall is in contact with the upper terminal edge of the reverse bend. In another embodiment, the outer sleeve can further comprise another (second) bottom wall attached to a lower end of the thereof. In this embodiment, at least a portion of the lower end of the receptacle sidewall is in contact with the second bottom wall.

Another aspect of the present invention is directed to a method of forming multi-walled container. The method may include the steps of obtaining an inner receptacle including a sidewall having a first taper angle and a bottom wall, forming a lower end of the receptacle sidewall such that the lower end of the sidewall has a second taper angle different from the first taper angle, obtaining an outer sleeve having an inner surface and an outer surface, and combining the outer sleeve and inner receptacle such that at least a portion of a lower edge of the lower end of the receptacle sidewall is in contact with the inner surface of the outer sleeve. The may also include forming a reverse bend portion into the lower end of the outer sleeve, wherein the reverse bend portion has upper terminal edge, and positioning the outer sleeve relative to the inner receptacle such that at least a portion of the lower edge of the lower end of the receptacle sidewall is in contact with the upper terminal edge of the reverse bend of the outer sleeve.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

Figure 1:
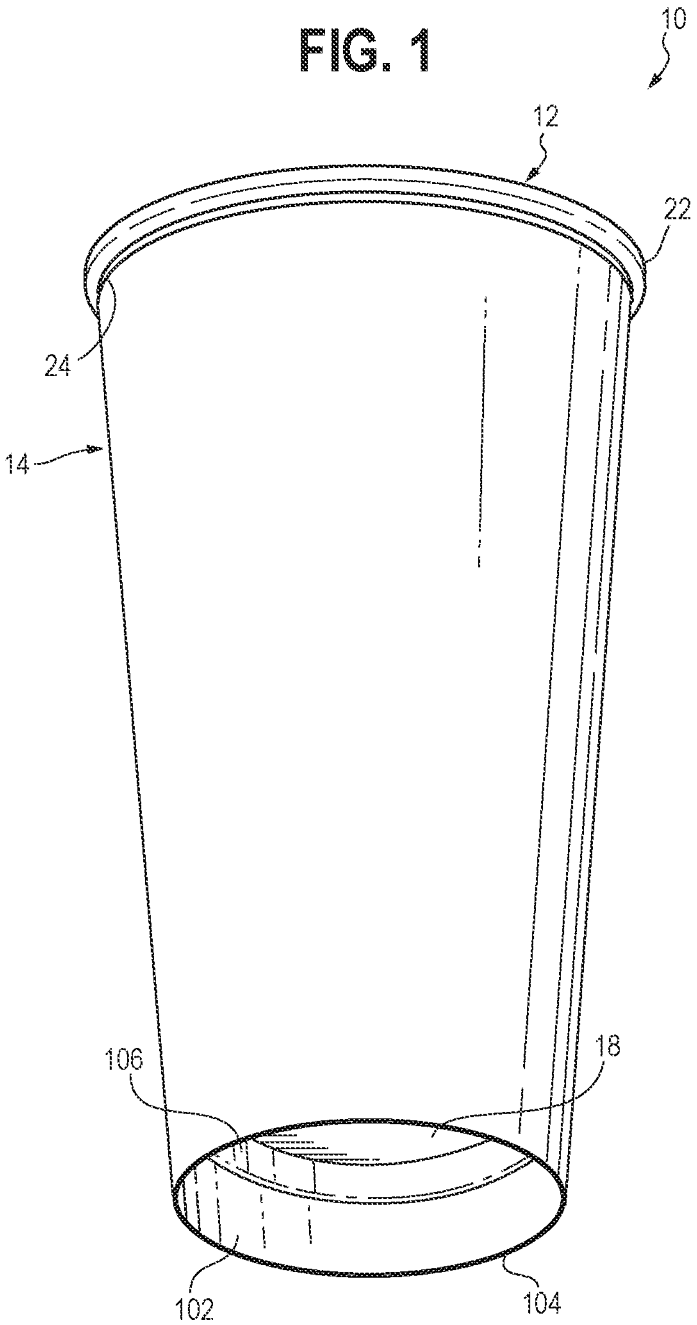
FIG. 1 is a side perspective view of a container with a bottom end construction in accordance with a first embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention.

Referring to the figures, the present invention is directed to a cup or container 10 and a bottom end construction 100 therefor as illustrated in the several figures. While the container 10 may be adapted for holding food and drink, it will be appreciated that it can also be used in connection with the storage and transportation of other items. In addition, the bottom end construction 100 as described herein may be suitably utilized in connection with several different types and styles of containers 10 whether or not described specifically herein.

According to one embodiment of the present invention, bottom end construction 100 can be utilized with containers 10 having an increased sidewall height. For example, it is often desirable to have containers 10 of different sizes (e.g., small, medium, large, etc.) for use in food- and drink-service applications while maintaining a common overall upper edge diameter to allow the same lid to be used with each different sized container. One common method for providing such containers 10 is to increase the height of the sidewall of the larger containers 10. However, due to the increased height of the sidewall, the containers 10 are more susceptible to becoming stuck together when nested.

Figure 4:
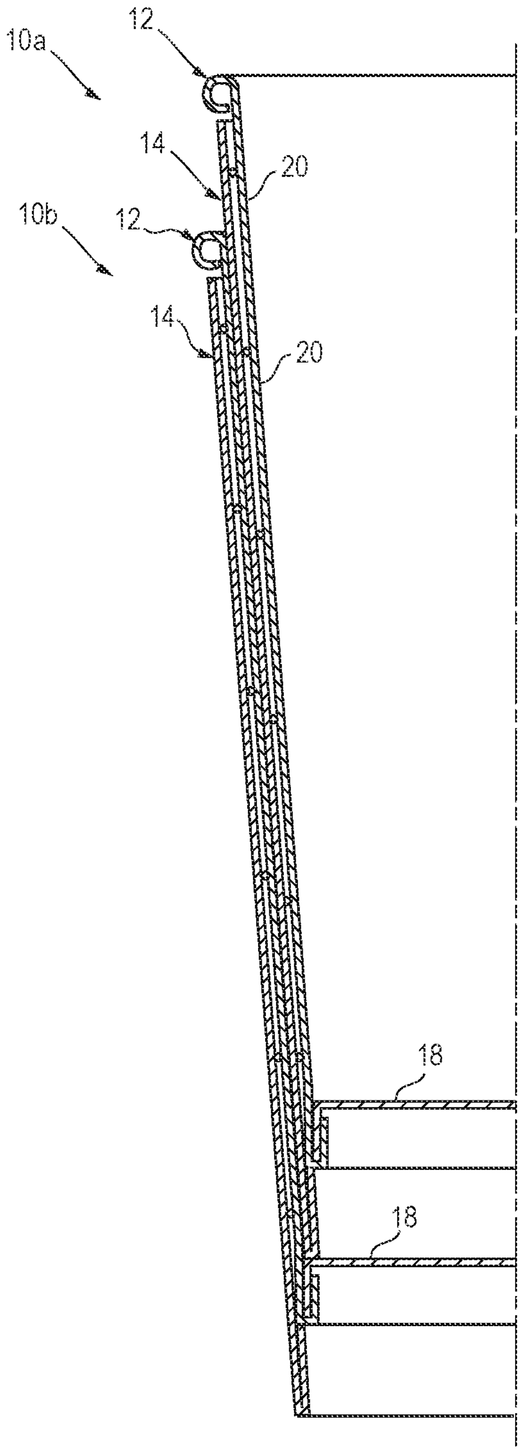
FIG. 4 is a side sectional view of two containers, each as shown in FIG. 2, in a nested arrangement.
Figure 8:
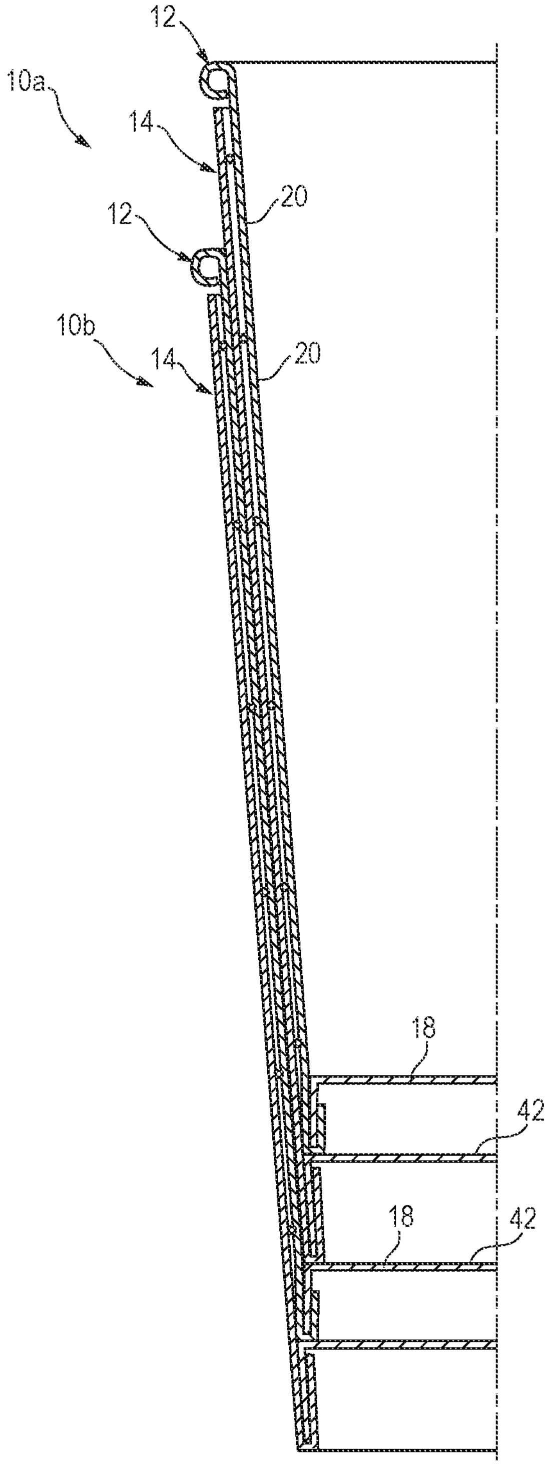
FIG. 8 is a side sectional view of two containers, each as shown in FIG. 6, in a nested arrangement.

Bottom end construction 100 of the present invention can provide a deep overall bottom recess at the lower end of the containers 10, which can reduce the chance that stacked or nested containers 10 will become inadvertently stuck together because the inner container 10*a* can rest on the bottom wall 18 of the outer container 10*b* (as generally depicted in FIGS. 4 and 8) instead of against the sidewall 20 of the outer container 10*b*. Bottom end construction 100 can also eliminate the need for a fully formed and crimped deep bottom recess in containers 10 of increased height (which can be difficult to form an effective water-tight seal) while still providing a deep overall bottom recess. As described in greater detail herein, according to one embodiment, bottom end construction 100 can utilize an extended outer sleeve that can allow the lower end of each container 10 to rest on the bottom wall of the outer container 10 when multiple containers 10 to be stacked or nested together, which can reduce the risk of containers 10 becoming stuck together. As further described herein, bottom end construction 100 can be adapted to assist in the alignment and indexing of the components of the container 10, which can increase the uniformity of the containers 10 and reduce the risk of containers 10 becoming stuck together.

Examples of two primary embodiments are illustrated in the drawings and described herein. A first embodiment is depicted in FIGS. 1-4, and a second embodiment is depicted in FIGS. 5-8. However, it will be appreciated that the scope of the present invention includes other embodiments and suitable variants thereof. The primary deviation between the embodiments specifically shown and described herein relates to the bottom end constructions 100 thereof.

Referring to the figures, container 10 may generally include an inner receptacle 12, an outer wrapper or sleeve 14, and beads of adhesive 30 applied between inner receptacle 12 and outer sleeve 14 for optionally creating an insulating void space or air gap 32 therebetween. As best shown best in FIGS. 1 and 6, inner receptacle 12 may have a generally frustoconical shape with a generally circular transverse cross sectional shape of varying diameter that decreases in size from a top end of receptacle 12 to a bottom end of receptacle 12, where its degree of taper or angle may change. As further shown in FIGS. 1 and 6, outer sleeve 14 may be configured to also have a generally conforming frustoconical shape with a generally circular transverse cross sectional shape when wrapped around receptacle 12. As shown, the taper of the outer sleeve 14 may generally correspond to the taper of the sidewall 20 of the inner receptacle 12. The taper of the sidewall of container 10 (including outer sleeve 14 and receptacle sidewall 20) can permit staking and nesting of multiple containers 10 for storage and shipping. However, it will also be appreciated that containers 10 having other shapes and configurations are also within the scope of the present invention. For example, containers having straight or vertical sidewalls, inverted frustoconical sidewalls, sidewalls of non-uniform taper, and sidewalls that are non-round in cross-sectional shape are also within the scope of the present invention.

In certain embodiments of the present invention, container 10 can also include an intermediate layer of insulating material or an air gap positioned between inner receptacle 12 and outer sleeve 14. In other embodiments, outer sleeve 14 may alternatively be attached directly to inner receptacle 12 with no air gap or insulating layer therebetween. In yet further embodiments, outer sleeve 14 may alternatively comprise a uniform thickness, thicker than the thickness of inner receptacle 12, such that outer sleeve 14 may act as an insulating layer.

In one embodiment, receptacle 12 is constructed in accordance with a well-known existing design. Sidewall 20 of receptacle 12 can be formed from a blank and wrapped around a mandrel. Sidewall 20 may include an overlapping seam (not shown) extending generally longitudinally between the top and bottom ends of receptacle 12. The seam (not shown) can be formed by adhering the overlapping margin portions of sidewall 20 together with adhesive, sonic welding or the like. The exposed edges of sidewall 20 at the seam can be sealed to prevent the migration of liquids into the material comprising sidewall 20. At its top end, receptacle 12 may be formed with an outwardly rolled upper lip 22. At its lower end, receptacle 12 may be formed with a bottom panel or circular bottom wall 18 having a downwardly depending annular leg or skirt 26 that is secured to receptacle sidewall 20 by a reverse bend portion 28 of receptacle sidewall 20. As shown, the lower end of receptacle sidewall 20 extends along the outer surface of the depending annular skirt 26, wraps under a bottom edge or lower edge thereof, and extends upwardly along the interior surface of annular skirt 26 toward the bottom panel 18. The lower portion of the receptacle sidewall 20 forming the reverse bend 28 may be crimped around the annular skirt 26 to create a liquid tight seal therebetween. This securement may be achieved by adhesive, sonic welding, sealants or the like. It will be understood that other lower end structures, including those not having a reverse bend, are also within the scope of the present invention.

Depending on the particular embodiment, both bottom wall 18 and receptacle sidewall 20 may be die cut from a larger sheet or roll (not shown) or material; and/or may be formed from a unitary blank or multiple blank components depending on the particular embodiment of the present invention. According to one embodiment, receptacle 12 and outer sleeve 14 may be constructed of paperboard or a similar material, such as but not limited to, a coated or laminated paperboard material in order to resist migration of liquids contained within the interior volume defined by sidewall 20 and circular bottom wall 18. However, it will also be appreciated that receptacle 12 and outer sleeve 14 may be constructed from any other suitable type of material or combination of materials. Other constructions for receptacle 12 and outer sleeve 14 are within the scope of the present invention. In alternative embodiments (not shown), receptacle 12 and 14 may be constructed using any other suitable method for constructing paperboard or similar containers (even plastic containers) now known or hereinafter developed. Receptacle 12 and outer sleeve 14 may be constructed of materials having generally uniform thickness, or may be constructed to include embossments, debossments, or other features that creates a non-uniform thickness.

Outer sleeve 14 may be applied to or wrapped around sidewall 20 of inner receptacle 12 and again can be affixed to sidewall 20 with an adhesive in one embodiment. In an alternative embodiment, outer sleeve 14 may be formed separately around a mandrel and then the inner receptacle 12 may be slid into the formed outer sleeve 14 (or conversely the formed outer sleeve 14 may be slid around the inner receptacle 12). Adhesive 30 may optionally be applied to secure the outer sleeve 14 to the inner receptacle 12. Adhesive 30 can be applied in the form of horizontal hot glue bands (or HGBs) that have a defined thickness T forming an air gap 32 between receptacle 12 and outer sleeve 14. Adhesive 30 may be applied between all or a portion of the height between receptacle 12 and outer sleeve 14. According to certain embodiments, outer sleeve 14 may be wrapped around inner receptacle 12 and seam 16 may be secured using an adhesive or other suitable securement means. It will be appreciated that the adhesive may be applied in any suitable arrangement or pattern, including but not limited to one or more continuous or intermittent horizontal bands, one or more vertical stripes, lines, dots, or any other suitable application of adhesive. In addition, outer sleeve 14 may be secured to inner receptacle 12 using any suitable method, including but not limited to cold glues, hot melts, sonic welding, sealants and the like. According to additional embodiments, an insulating liner and/or one or more spacers may be provided between receptacle sidewall 20 and outer sleeve 14. In other embodiments, where adhesive is not applied or is only minimally applied, the outer sleeve 14 may be retained relative to the inner receptacle 12 via other means, such as by a friction fit or an interlocking engagement, for example.

While outer sleeve 14 can include a vertically-extending overlapping side seam 16 in one embodiment when it is formed, it is recognized that in other embodiments seam 16 may be configured as an end-to-end seam, butt seam, or any other suitable type of seam or configuration. Outer sleeve 14 may be configured to have a generally conforming frustoconical shape with a generally circular transverse cross sectional shape when wrapped around receptacle 12. Again, the taper of the overall container 10 can permit nesting or stacking for storage and shipping.

Figure 2:
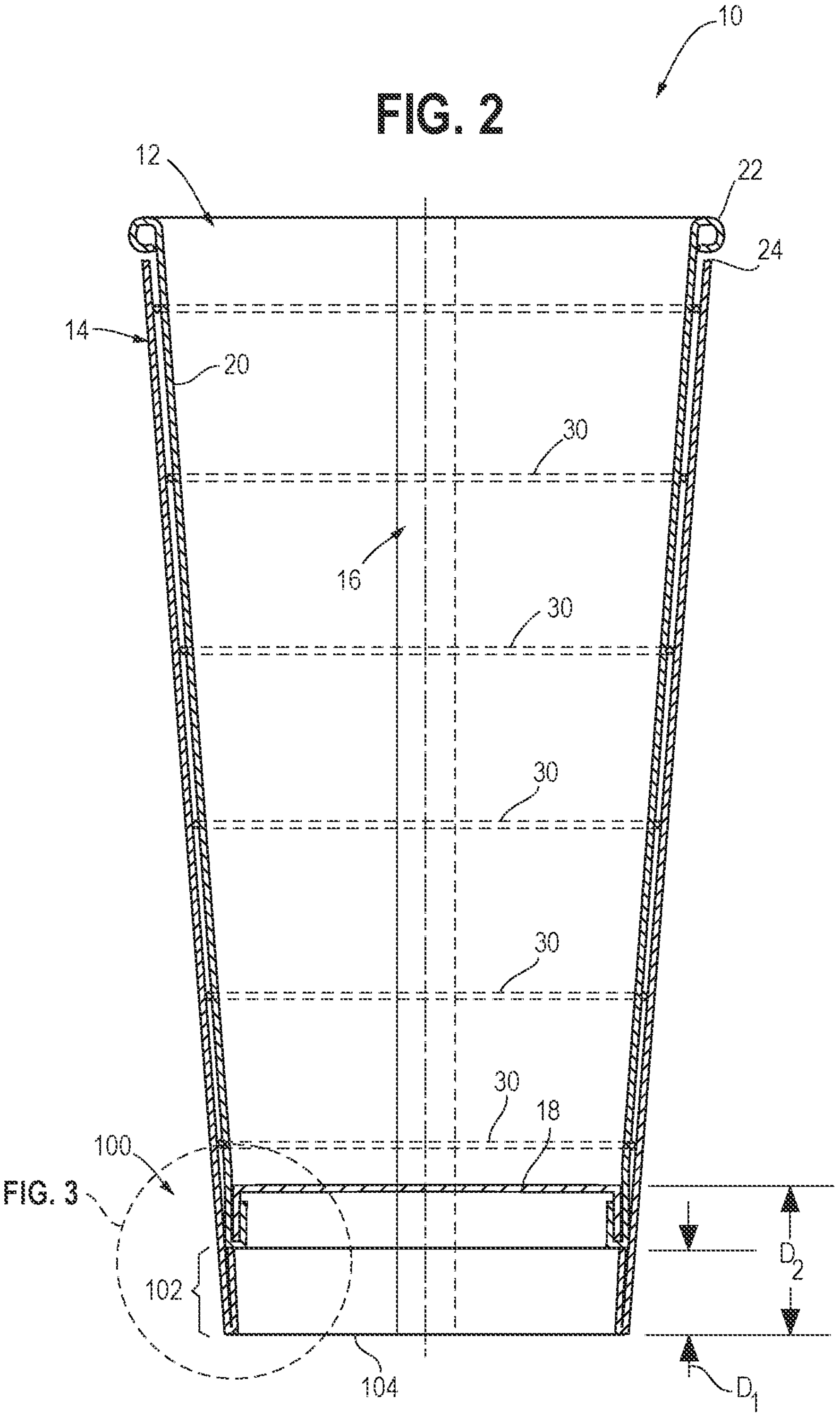
FIG. 2 is a schematic side sectional view of the container of FIG. 1.

In one embodiment, upper end of outer sleeve 14 is not folded or rolled, and its upper edge is left unfinished. Top edge 24 of outer sleeve 14 can be configured to generally align with and be positioned just below rolled upper edge 22 of receptacle 12, while the bottom edge 104 of outer sleeve 14 can extend below the bottom end of receptacle 12. According to such an embodiment, as illustrated in FIG. 2, outer sleeve 14 may be configured with a height greater than the height of receptacle 12. In alternative embodiments, outer sleeve 14 may have a height less than that of receptacle 12 where outer sleeve 14 is configured not to extend the entire height of receptacle 12 so that bottom edge 36 may extend below the bottom end of receptacle 12. In such embodiments, outer sleeve 14 may extend upward only a portion of the height of sidewall 20 of receptacle 12.

Container 10 can include a bottom end construction 100 at its lower end formed, at least in part, by outer sleeve 14. As best shown in FIGS. 2-3 and 6-7, bottom end construction 100 can include an extension portion 102 of outer sleeve 14 that extends below the lower end of receptacle 12 a distance $D_1$ and lower terminal edge 104 that defines a bottom edge of container 10. According to one embodiment of the present invention, extension portion 102 can extend below the lower end of inner receptacle 12 a distance $D_1$ of approximately 0.5 inches, for example. However, in other embodiments, extension portion 102 can have a height of any suitable value forming a distance $D_1$ that is less than or greater than 0.5 inches, for example between about 0.25 and about 0.75 inches in one embodiment. Extension portion 102 can assist in creating a deeper recess at the bottom end of container 10 (by forming a greater distance $D_2$ between lower terminal edge 104 and circular bottom wall 18 of receptacle 12) so that when multiple containers 10 are stacked and nested together, the containers 10 are prevented from fully nesting together and are less likely to become stuck to one another. It will be appreciated that distance $D_2$ may be approximately 0.75 inches in one embodiment, for example. However, distance $D_2$ may certainly be less than or greater than 0.75 inches in other embodiments, for example between about 0.5 and about 1.0 inch in one embodiment.

The deep well formed by bottom end construction 100 in the present invention can be particularly beneficial for stacked containers 10 having greater sidewall heights. Such containers have a tendency to become stuck together if fully nested, and the creation of a deeper well bottom of such containers can prevent full nesting of the containers, such that they do not become frictionally stuck or vacuum locked together. In doing so, extension portion 102 results in the lower terminal edge 104 of an inner container 10*a* becoming rested or seated on the bottom wall 18 of an outer container 10*b* to prevent the sidewalls of the containers 10*a* and 10*b* from becoming stuck together, as is generally illustrated in FIGS. 4 and 8.

Lower terminal edge 104 of outer sleeve 14 can be formed by the fold line resulting from reverse bend portion 34. In reverse bend portion 34, a lower portion of outer sleeve 14 can be folded inwardly back onto itself. Reverse bend portion 34 can be crimped such that it is entirely flattened directly against and attached to the inner surface 36 of outer sleeve 14, and there are no loops, cavities, voids, or air pockets formed by the reverse bend portion. Thereby, lower terminal edge 104 creates a lower boundary of outer sleeve 14. Alternatively, reverse bend portion 34 need not be crimped against the inner surface 26 of outer sleeve 14. In other embodiments, the lower end of outer sleeve 14 does not include a reverse bend portion, but rather terminates in a free, unfolded edge. For example, the lower end of outer sleeve 14 may be constructed in accordance with the disclosures of U.S. patent application Ser. No. 16/744,851, filed on Jan. 16, 2020, for a "Container and Bottom End Construction Therefor," the entire disclosure of which is incorporated herein by reference.

As mentioned above, the figures illustrate multiple embodiments of container 10. Each of the embodiments may be constructed and share many of the features above. The differences in each of the embodiments, and particularly the lower end constructions 100 therefore, will be explained and distinguished below.

FIGS. 1-4 illustrate a first embodiment of container 10. In this embodiment, reverse bend portion 34 is formed such that a lower portion of outer sleeve 14 is folded inwardly and sealed back onto itself. Again, reverse bend portion 34 can optionally be crimped such that it is entirely flattened and sealed directly against the inner surface of outer sleeve 14, such that there are no loops, cavities, voids, or air pockets formed by the reverse bend portion 34.

Figure 3:
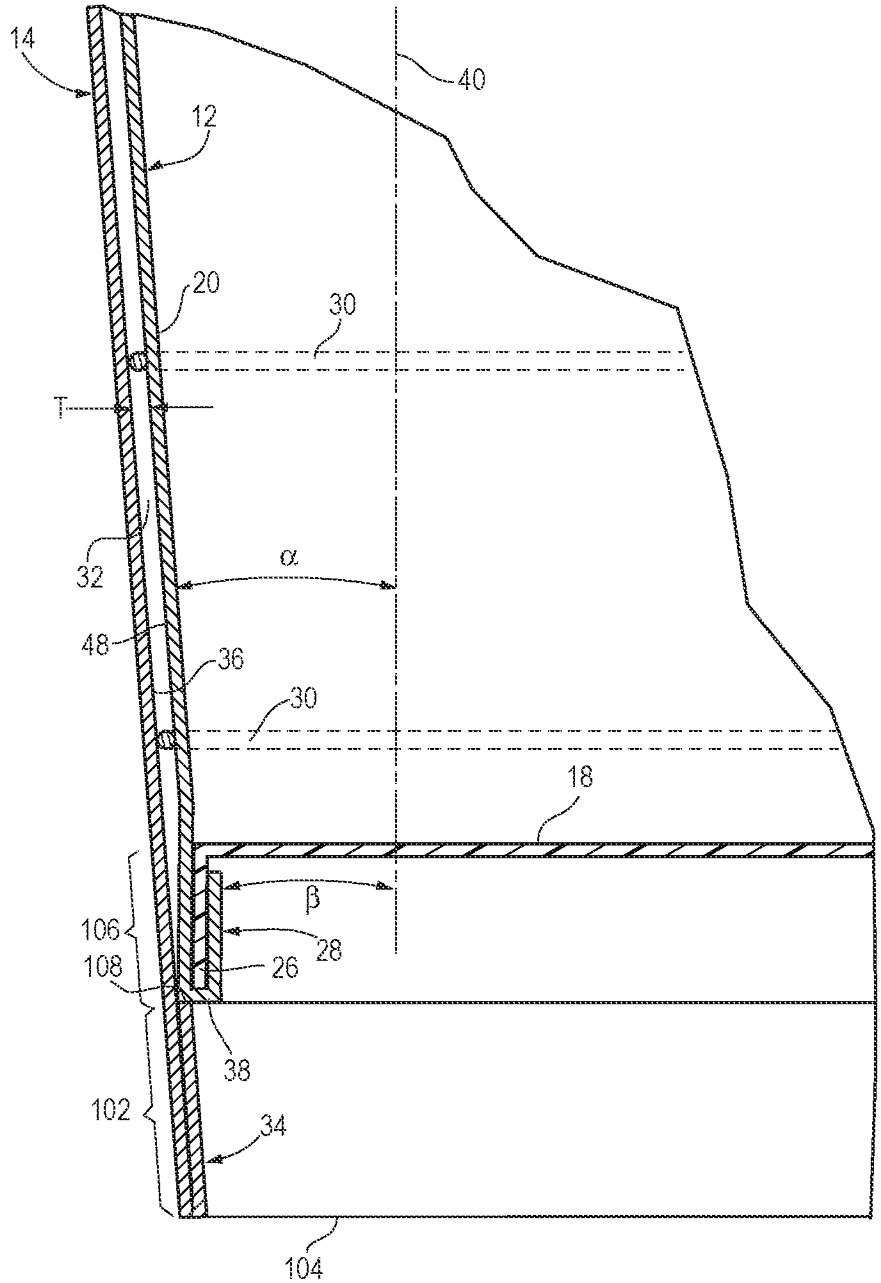
FIG. 3 is an enlarged schematic partial sectional view of the container in the balloon 3 of FIG. 2.

As shown, the angle of inclination or taper angle β of a lower end 106 of inner receptacle 12 (i.e., the portion just below bottom wall 18) deviates from the angle of inclination or taper angle α of the remainder of sidewall 20. FIG. 3 illustrates angles α and β as measured relative to an arbitrarily placed vertical line 40. Depending on the embodiment, lower end 106 may be flared outwardly relative to sidewall 20, may be generally vertical, or may otherwise have an angle of inclination or taper angle differing from that of sidewall 20.

In one embodiment, the taper angle α of the of sidewall 20 may be between about 0° and 30°, in another embodiment it may be between about 1° and 7°, in another embodiment it may be between about 3° and 5°, and it yet a further embodiment it may be about 4.25°. The taper angle for outer sleeve 40 may correspond generally to that of sidewall 20.

Figure 9A:
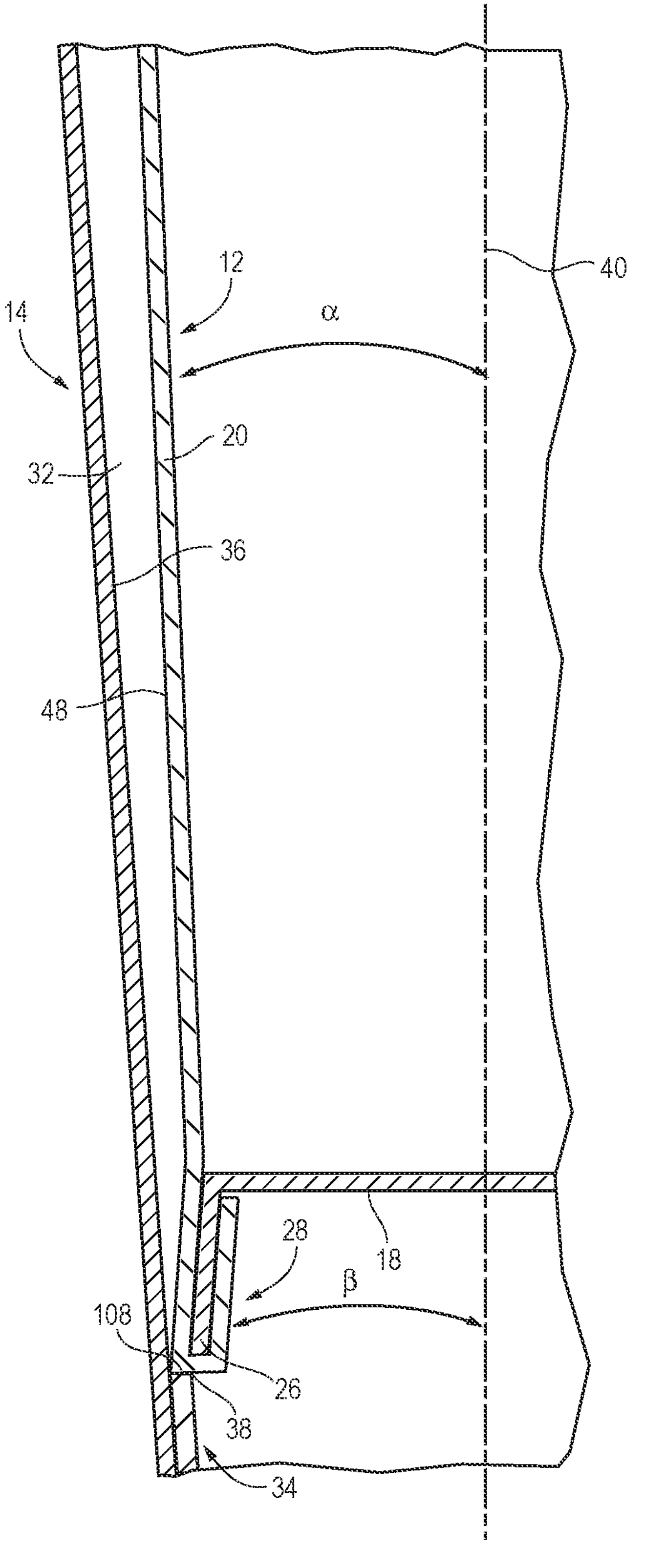
FIG. 9A is an enlarged schematic partial sectional view of a container in accordance with another embodiment of the present invention.

In one embodiment, as best illustrated in FIG. 9A, lower end 106 may be flared outwardly relative to sidewall 20 (such that angle $\beta<0°$). In another embodiment, as demonstrated in FIG. 9B, lower end 106 may be directed downwardly or generally vertically (such that angle β is about 0°). In other words, in this embodiment, the angle between the bottom wall 18 and the lower end 106 may be approximately 90°. In a further embodiment (not shown) lower end 106 may be directed inwardly (such that angle $\beta>0°$) albeit at an angle that is steeper than the taper α of sidewall 20. Accordingly, in one embodiment, the taper angle β of the of lower end 106 may be between about −30° and 5°, in another embodiment it may be between about −10° and 2°, in another embodiment it may be between about −1° and 1°, and it yet a further embodiment it may be between about 0°.

Figure 9B:
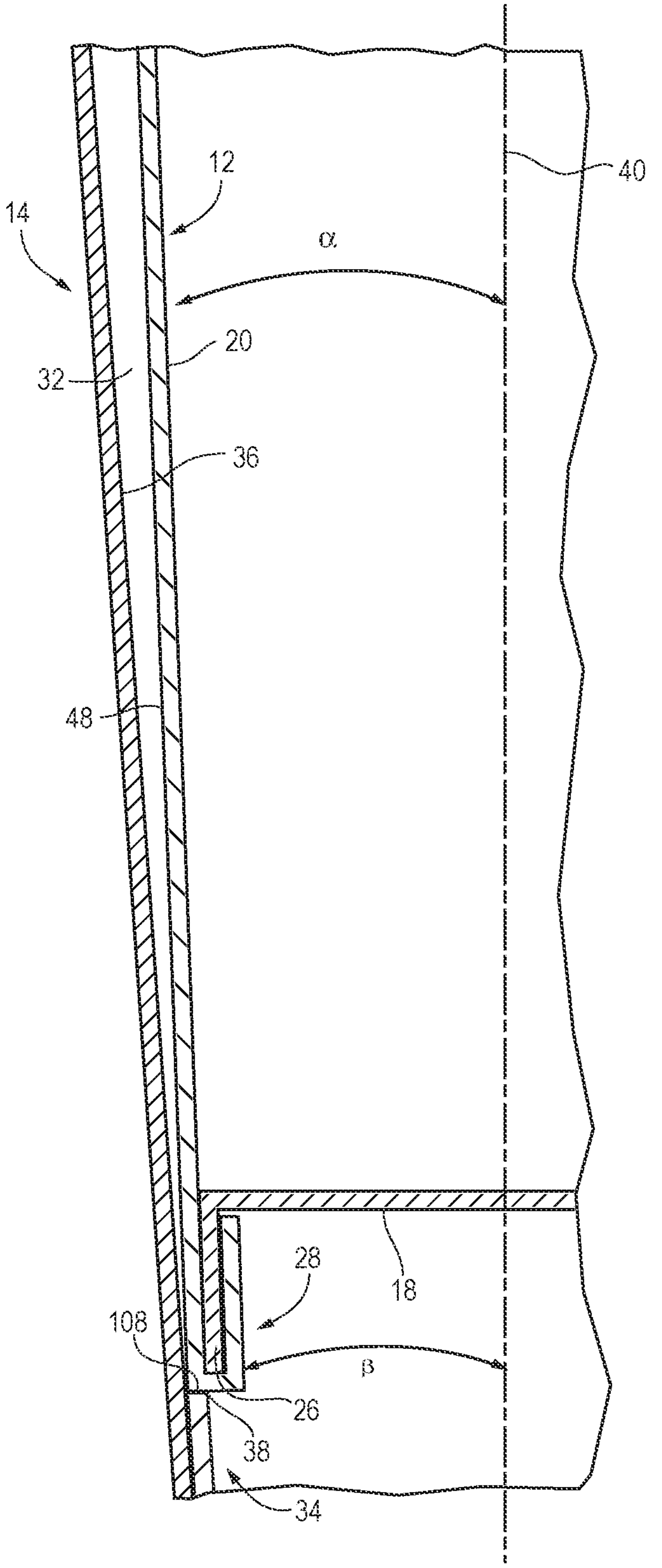
FIG. 9B is an enlarged schematic partial sectional view of a container in accordance with a further embodiment of the present invention.

As demonstrated, for example, in FIGS. 3, 9A, and 9B, a lower outer edge, corner or other portion of lower end 106 may contact or engage inner surface 36 of outer sleeve 14, which can be beneficial in aligning or indexing inner receptacle 12 relative to outer sleeve 14. This can also be beneficial in ensuring a proper amount of space and a uniform gap between the inner receptacle 12 and outer sleeve 14, that is, the circumferential or radial distance between the outer surface 48 of receptacle sidewall 20 and inner surface 36 of outer sleeve 14. This engagement may also be beneficial in the angular alignment of inner receptacle 12 and outer sleeve 14 about a longitudinal axis. Further, this engagement may be beneficial in the vertical placement of inner receptacle 12 and outer sleeve 14 relative to one another. As further demonstrated in FIGS. 3, 9A, and 9B, lowermost edge 38 of inner receptacle 12 may engage, contact or sit on upper edge 108 of reverse bend portion 34 of outer sleeve 14. It will be appreciated, again, that this engagement can be beneficial in aligning, indexing and/or vertically positioning outer sleeve 14 relative to inner receptacle 12 or vice versa, as set forth above. The aligning, indexing and/or positioning outer sleeve 14 relative to inner receptacle 12 or vice versa as discussed herein can ensure that consistency, uniformity and manufacturing tolerances, particularly in high-speed manufacturing operations of the container 10, may be achieved. As discussed, consistent and uniform alignment, spacing and indexing of the outer sleeve 14 relative to inner receptacle 12 further results in containers 10 that may be stacked or nested in a manner such that they do not become frictionally stuck or vacuum locked together.

FIGS. 5-8 illustrate another embodiment of container 10. This embodiment employs a "cup-within-a-cup" construction per se (i.e., an inner cup placed within an outer cup). In this regard, similar to sidewall 20 of inner receptacle 12, outer sleeve 14 in this embodiment also includes a bottom wall 42 attached to the lower end or extension portion 102 thereof. In other words, at its lower end 102, outer sleeve 14 may be formed with a circular bottom wall 42 having a downwardly depending skirt 44 that is secured to sidewall 14 by a reverse bend portion 34 of outer sleeve 14. Reverse bend portion 34 may be formed such that a lower portion of outer sleeve 14 is folded inwardly and sealed back onto skirt 44 of bottom wall 42. Skirt 44 of bottom wall 42 is in turn sealed against inner surface 36 of outer sleeve 14. Like with other embodiments, reverse bend portion 34 can optionally be crimped such that there are no loops, cavities, voids, or air pockets formed by reverse bend portion 34.

Figure 7:
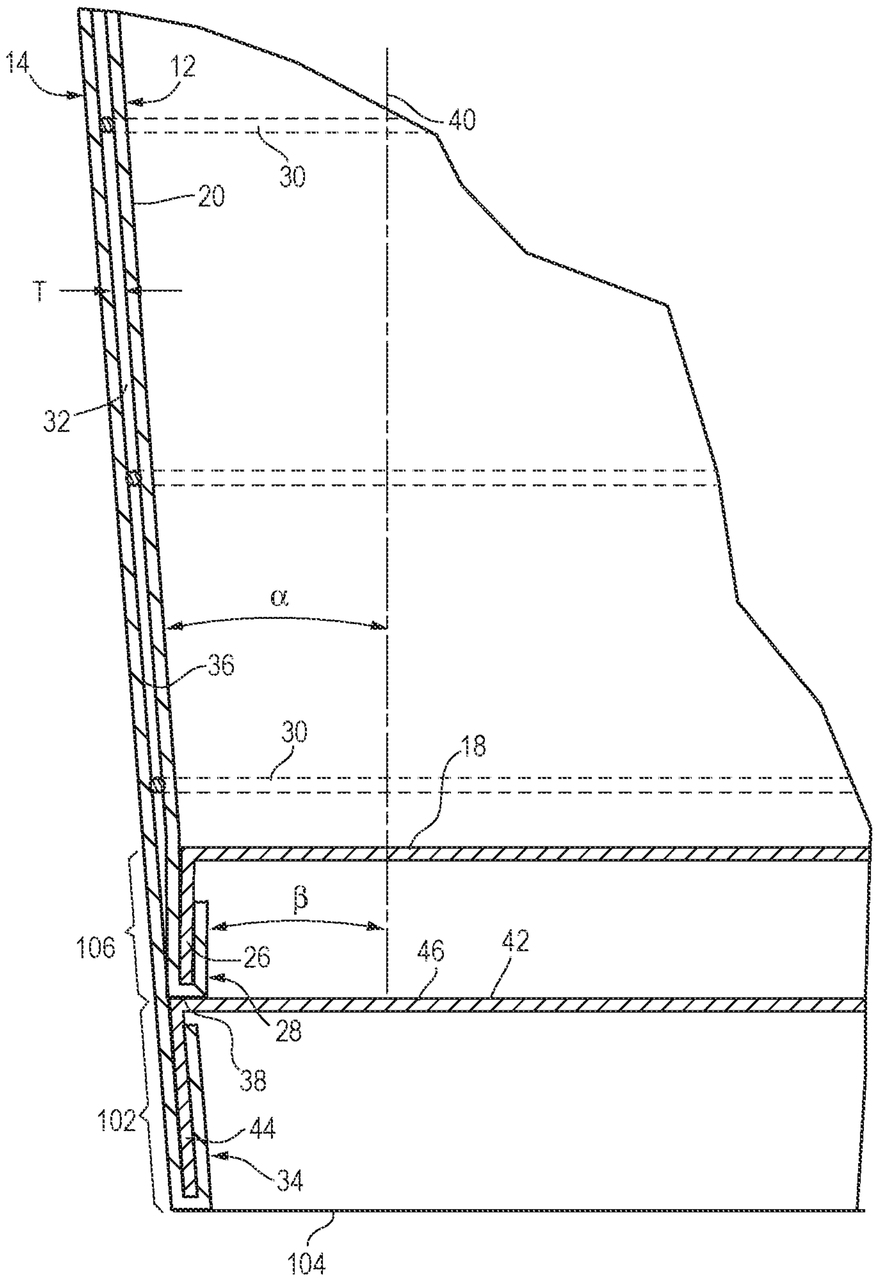
FIG. 7 is an enlarged schematic partial sectional view of the container in the balloon 7 of FIG. 6.

As with the embodiment illustrated in FIGS. 1-4, the taper angle β of a lower end 106 of inner receptacle 12 (i.e., the portion just below bottom wall 18) deviates from the taper angle α of the remainder of sidewall 20. FIG. 7 illustrates angles α and β as measured relative to an arbitrarily placed vertical line 40. In that regard, lower end 106 may be flared outwardly relative to sidewall 20, as shown in FIG. 7 (such that angle $\beta<0°$), may be directed downwardly or vertically (such that angle β is about 0°), or may be directed inwardly (such that angle $\beta>0°$) albeit at an angle that is steeper than the taper angle of sidewall 20.

As best demonstrated in FIG. 7, a lower outer edge, corner or other portion of lower end 106 may contact or engage inner surface 36 of outer sleeve 14, which again can be beneficial in aligning or indexing inner receptacle 12 relative to outer sleeve 14. This can also be beneficial in ensuring a proper amount of space and a uniform gap between the inner receptacle 12 and outer sleeve 14, that is, the circumferential or radial distance between the outer surface 48 of receptacle sidewall 20 and inner surface 36 of outer sleeve 14. This engagement may also be beneficial in the angular alignment of inner receptacle 12 and outer sleeve 14 about a longitudinal axis. Further, this engagement may be beneficial in the vertical placement of inner receptacle 12 and outer sleeve 14 relative to one another. As further demonstrated in FIG. 7, lowermost edge 38 of inner receptacle 12 may engage, contact or sit on an upper surface 46 of bottom wall 42. It will be appreciated, again, that this engagement can be beneficial in aligning, indexing and/or vertically positioning outer sleeve 14 relative to inner receptacle 12 or vice versa, as set forth above. The aligning, indexing and/or positioning outer sleeve 14 relative to inner receptacle 12 or vice versa as discussed herein can ensure that consistency, uniformity and manufacturing tolerances, particularly in high-speed manufacturing operations of the container may be achieved. As discussed, consistent and uniform alignment, spacing and indexing of the outer sleeve 14 relative to inner receptacle 12 further results in containers 10 that may be stacked or nested in a manner such that they do not become frictionally stuck or vacuum locked together.

Figure 5:
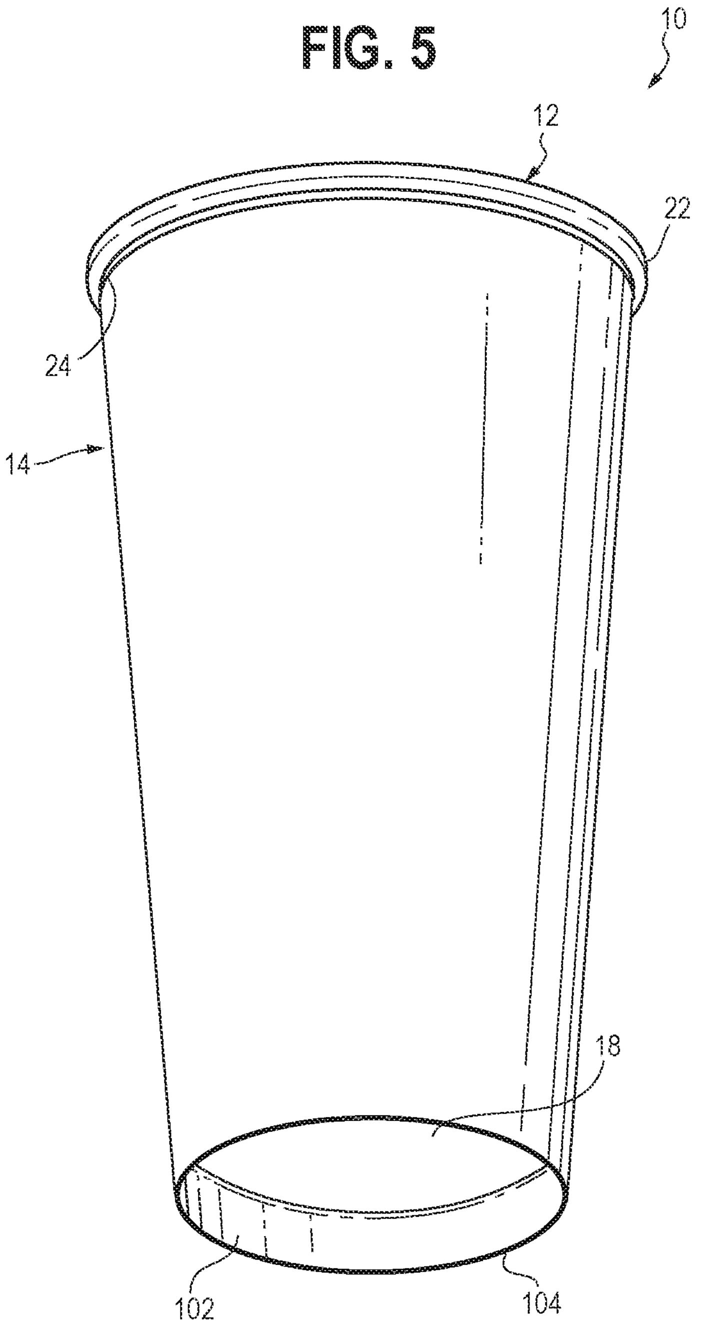
FIG. 5 is a side perspective view of a container with a bottom end construction in accordance with a second embodiment of the present invention.
Figure 6:
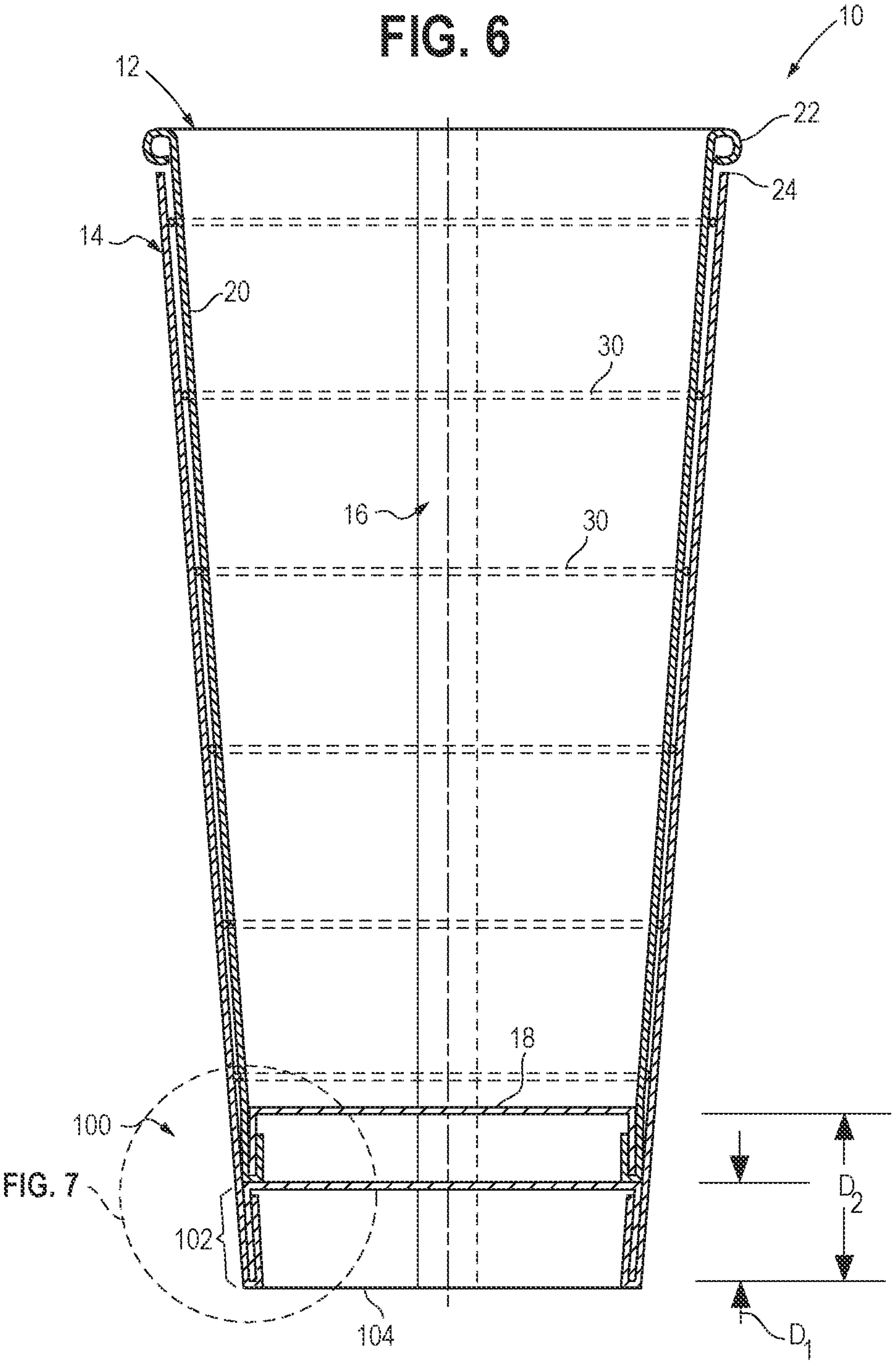
FIG. 6 is a schematic side sectional view of the container of FIG. 5.

Furthermore, as illustrated in FIG. 5, lower end 106 of inner receptacle 12 is covered by outer sleeve 14 and bottom wall 42, and is therefore not visible, in contrast to the embodiment demonstrated in FIG. 1.

In a method of forming the container 10, as discussed above, sidewall 20 and bottom wall 18 of inner receptacle 12 may be cut from a sheet of material. The blank which forms sidewall may be wrapped around a mandrel and connected at its side edge portions to form a frustoconical sidewall 20. Depending skirt 26 may be formed into bottom wall 18 and then a lower portion of sidewall 20 may be attached, fixed or otherwise connected to depending skirt 26. In one embodiment, such attachment is achieved by forming a reverse bend portion 28, as described above. Either before, during, or after the step of attaching bottom wall 18 and/or depending skirt 26 thereof to sidewall 12, the lower end 106 of sidewall 20 can be bent, deformed, pressed, pulled, or otherwise manipulated such lower end 106 has a taper angle β that deviates from the taper angle α of the remainder of sidewall 20, as described above.

One embodiment of the method also includes the step of cutting that blank that forms outer sleeve 14 from a sheet of material. A lower end of sleeve 14 may be folded, the fold which eventually forms reverse bend portion 34. Outer sleeve 14 may be applied to or wrapped around sidewall 20 of inner receptacle 12 and again can be affixed to sidewall 20 with an adhesive in one embodiment. Sleeve 14 may be applied around inner receptacle 12 such that a lower outer edge, corner or other portion of lower end 106 of inner receptacle 12 may contact or engage inner surface 36 of outer sleeve 14, while some or all of a remaining portion of outer sleeve 14 is not in direct contact with inner receptacle 12 or sidewall 20 thereof. Further, sleeve 14 may be applied around inner receptacle 12 such that lowermost edge 38 of inner receptacle 12 may engage, contact or sit on upper edge 108 of reverse bend portion 34 of outer sleeve 14.

In an alternative embodiment of the method, sleeve 14 may be formed separately and subsequently applied to inner receptacle 12. In this instance, the blank which forms sleeve 14 may be wrapped around a mandrel and connected at its side edge portions to form sleeve 14. A lower end of sleeve 14 may be formed into a reverse bend portion 34. The formed sleeve 14 may then be slid around inner receptacle 12, or alternatively, inner receptacle 12 may be inserted or slid into formed outer sleeve 14. Again, outer sleeve 14 may be applied to inner receptacle 12 such that a lower outer edge, corner or other portion of lower end 106 of inner receptacle 12 may contact or engage inner surface 36 of outer sleeve 14, while some or all of a remaining portion of outer sleeve 14 is not in direct contact with inner receptacle 12 or sidewall 20 thereof. Further, outer sleeve 14 may be applied to inner receptacle 12 such that lowermost edge 38 of inner receptacle 12 may engage, contact or sit on upper edge 108 of reverse bend portion 34 of outer sleeve 14.

The method of forming the "cup-within-a-cup" embodiment shown in in FIGS. 5-8 may be generally similar to that described above. That is, outer cup/sleeve 14 may be formed around or may be separately from inner receptacle 12. Nonetheless, outer cup/sleeve 14 may be applied to inner receptacle 12 such that a lower outer edge, corner or other portion of lower end 106 may contact or engage inner surface 36 of outer sleeve 14. Further, outer cup/sleeve 14 may be applied to inner receptacle 12 such that lowermost edge 38 of inner receptacle 12 may engage, contact or sit on an upper surface 46 of bottom wall 42.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention.

What is claimed is:

1. A multi-walled container comprising:

an inner receptacle including a sidewall, an uppermost edge, a lowermost edge, and a first bottom wall, wherein an upper portion of the sidewall extending below the uppermost edge has a first taper angle and a lower end of the sidewall extending above the lowermost edge has a second taper angle, wherein the first bottom wall is attached to the lower end of the sidewall;

an outer sleeve having an inner surface and an outer surface, the outer sleeve at least partially surrounding the inner receptacle; and a second bottom wall, the second bottom wall being attached to a lower end of the outer sleeve;

wherein at least a portion of the lowermost edge of the lower end of the receptacle sidewall is in contact with the inner surface of the outer sleeve;

wherein at least a portion of the lower end of the receptacle sidewall is in contact with the second bottom wall.

2. The container of claim 1, wherein a lower end of the outer sleeve extends beyond and is located below the lowermost edge of the receptacle sidewall.

3. The container of claim 1, wherein the lowermost edge of the receptacle sidewall contacts the second bottom wall.

4. The container of claim 1, wherein the first bottom wall includes a downwardly depending annular skirt secured to the receptacle sidewall.

5. The container of claim 4, wherein the lower end of the receptacle sidewall forms a reverse bend portion at least partially surrounding the annular skirt of the first bottom wall.

6. The container of claim 1, wherein the second bottom wall includes a downwardly depending annular skirt secured to the inner surface of the outer sleeve.

7. The container of claim 6, wherein a lower end of the outer sleeve forms a reverse bend portion at least partially surrounding the annular skirt of the second bottom wall.

8. The container of claim 1, wherein a circumferential gap is defined between the inner receptacle sidewall and the outer sleeve.

9. The container of claim 8, wherein the circumferential gap is substantially uniform along the upper portion of the inner receptacle sidewall.

10. The container of claim 1, wherein the first taper angle is between about 0° and about 30° measured from vertical and wherein the second taper angle is about between about −10° and about 2° measured from vertical.

11. The container of claim 1, wherein the first taper angle is between about 3° and about 5° measured from vertical and wherein the second taper angle is about between about −1° and about 1° measured from vertical.

12. A multi-walled container comprising:

an inner receptacle including a sidewall and a first bottom wall, wherein a frustoconical upper portion of the sidewall has a first taper angle and a lower end of the sidewall has a second taper angle, wherein the first bottom wall is attached to the lower end of the sidewall;

an outer sleeve having an inner surface and an outer surface, the outer sleeve at least partially surrounding the inner receptacle and having a lower end that extends beyond and is located below the lower edge of the receptacle sidewall; and a second bottom wall, the second bottom wall being attached to a lower end of the outer sleeve;

wherein at least a portion of a lower edge of the lower end of the receptacle sidewall is in contact with the inner surface of the outer sleeve;

wherein at least a portion of the lower end of the receptacle sidewall is in contact with the second bottom wall.

13. The container of claim 12, wherein the second bottom wall includes a downwardly depending annular skirt secured to the inner surface of the outer sleeve.

14. The container of claim 13, wherein the lower end of the outer sleeve forms a reverse bend portion at least partially surrounding the annular skirt of the second bottom wall.

* * * * *